April 10, 1962     G. E. ATKINSON ET AL     3,028,890
TWO-POSITION BLADE CLAMPING MEANS FOR A SABRE SAW
Filed Oct. 11, 1960     3 Sheets-Sheet 1

INVENTORS
GEORGE E. ATKINSON
CLIFTON J. MARCH

BY Leonard Bloom
ATTORNEY

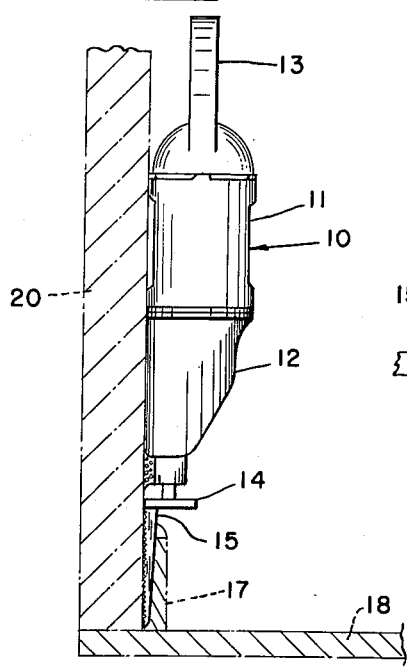
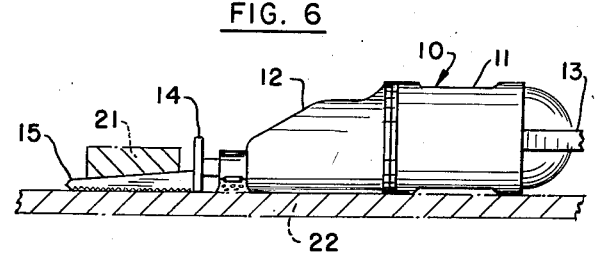
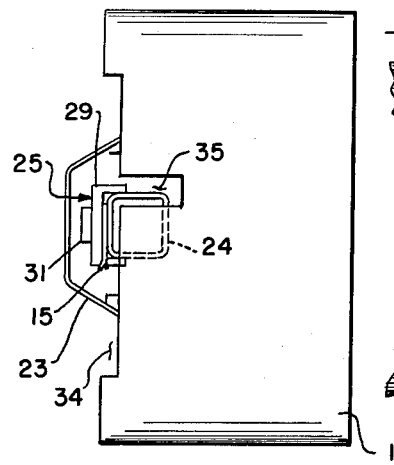
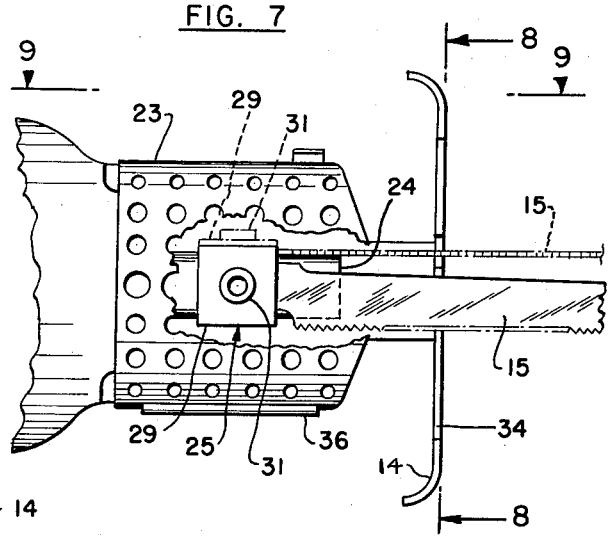
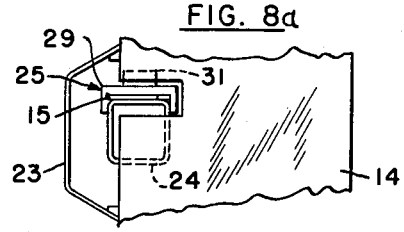
INVENTORS
GEORGE E. ATKINSON
CLIFTON J. MARCH
BY *Leonard Bloom*
ATTORNEY April 10, 1962  G. E. ATKINSON ET AL  3,028,890
TWO-POSITION BLADE CLAMPING MEANS FOR A SABRE SAW
Filed Oct. 11, 1960  3 Sheets-Sheet 3

INVENTORS
GEORGE E. ATKINSON
CLIFTON J. MARCH
BY
Leonard Bloom
ATTORNEY

United States Patent Office 3,028,890
Patented Apr. 10, 1962

3,028,890
TWO-POSITION BLADE CLAMPING MEANS FOR A SABRE SAW
George E. Atkinson, Linthicum Heights, and Clifton J. March, Phoenix, Md., assignors to The Black and Decker Manufacturing Company, Towson, Md., a corporation of Maryland
Filed Oct. 11, 1960, Ser. No. 61,916
5 Claims. (Cl. 143—156)

The present invention relates to a two-position blade clamping means for a sabre saw, and more particularly, to such clamping means that will enable the blade of the sabre saw to be selectively positioned in either of two mutually-perpendicular planes.

A conventional power-operated sabre saw is provided with a reciprocating shaft to which is secured a forwardly-projecting sabre-type blade. Such a tool is used for a variety of sawing operations, including the making and completing of a series of pocket cuts, such as a pocket cut in a wallboard, siding, or floor baseboard. When applying the teachings of the prior art to this latter application, namely, the making of a pocket cut in a floor baseboard, experience has indicated that it is ordinarily quite difficult or unwieldly to complete the pocket cut in a manner commonly referred to in the art as a "flush-to" pocket cut; such a pocket cut may be defined (for example) as one that necessitates the cutting teeth of the blade to just contact the adjacent floor at the completion of the cut. It will be appreciated, naturally, that a sabre saw is designed for a variety of sawing operations and that the geometry or configuration of the saw is such that it is not feasible to have the lower or cutting edge of the blade substantially parallel or aligned with the lowermost edges of the remainder of the tool; for example, the shoe itself will ordinarily interfere with the adjacent floor to preclude the further cutting of the floor baseboard. Consequently, in making a "flush-to" pocket cut, say in a floor baseboard, it is necessary for the operator to tilt or angle the saw in a vertical plane (and upwardly with respect to the floor) so as to continue the pocket cut down the baseboard until it terminates substantially at the floor. When so tilting the saw, it will be further appreciated that a certain part of the adjacent floor is being cut, which is inefficient, time-consuming, and hence undesirable.

Accordingly, it is an object of the present invention to alleviate these difficulties by providing means whereby a "flush-to" cut may be made without requiring a tilting of the saw in a plane which is perpendicular to the work.

It is another object of the present invention to provide a two-position blade clamping means for a sabre saw, whereby the cutting edges of the blade may be brought into substantial alignment with at least one series of longitudinal surfaces of the tool.

It is still another object of the present invention to provide a two-position blade clamping means for a sabre saw, which will allow the blade to be selectively clamped to the reciprocating shaft in either of two mutually-perpendicular planes, as desired.

It is yet another object of the present invention to provide in a sabre saw, a reciprocating shaft having at least two mutually-perpendicular walls, in combination with means to selectively clamp the sabre saw blade to either of the two mutually-perpendicular walls of the shaft, as desired.

These and other objects of the present invention will become apparent from a reading of the foregoing specification, taken in conjunction with the enclosed drawings, in which:

FIGURE 5 illustrates how the teachings of the present invention may be utilized in making a "flush-to" cut to cut away part of the baseboard itself;

FIGURE 6 illustrates the general utility of the present invention in making a perfect "flush-to" cut in a workpiece or board secured to the top of another (and wider) board;

FIGURE 7 is an enlarged side elevation of the forwardmost portion of the sabre saw, with part of the guard being broken away to illustrate the blade clamping means, the blade bing positioned as illustrated in FIGURE 1;

FIGURE 8 is a view taken from the lines 8—8 of FIGURE 7, illustrating the shoe (for the sabre saw) in front elevation;

FIGURE 8a is a portion of the shoe as viewed in FIGURE 8 but showing the sabre saw blade clamped in an alternate position for "flush-to" cutting;

Figure 1:
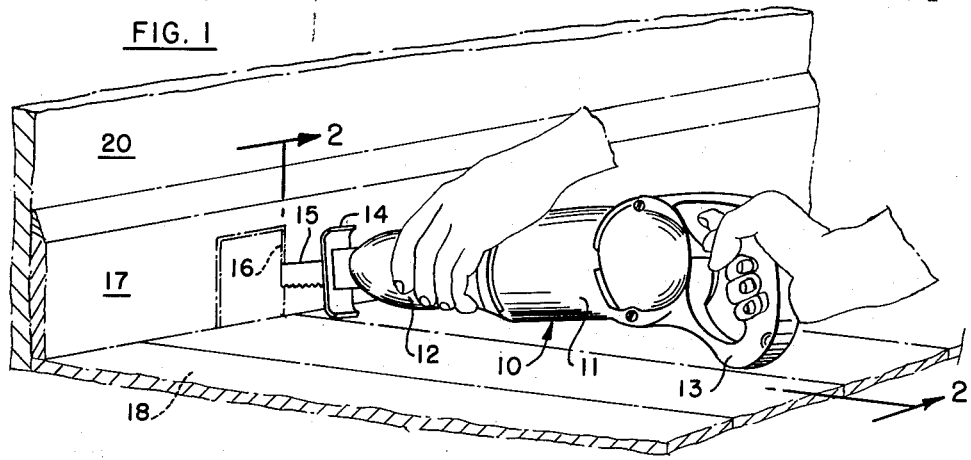
FIGURE 1 is a perspective view illustrating one use of the sabre saw in making a pocket cut in a floor baseboard.
Figure 3:
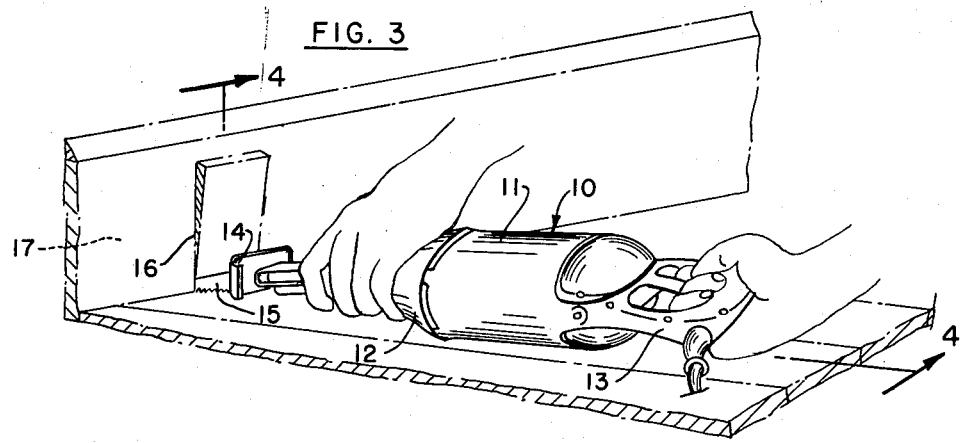
FIGURE 3 is a perspective view, corresponding to that of FIGURE 1, but illustrating that (with the blade clamped in an alternate mutually-perpendicular position) the entire sabre saw may then be positioned on its side to successfully and efficiently complete the flush-to cutting operation.

With particular reference to FIGURE 1, there is illustrated a power-operated sabre saw 10 which includes a motor housing 11, gear case 12, switch handle 13, shoe 14, and reciprocating blade 15; and one frequent application of the sabre saw 10 is the making of a series of pocket cuts 16 in the baseboard or molding 17 of a floor 18, as for example, in the installation of electrical receptacles. (It will be appreciated, of course, that the sabre saw 10 has a variety of uses and application, and that the specific example of FIGURE 1 has been provided to illustrate the inherent utility of the present invention; consequently, the scope of the present invention is not necessarily to be limited thereby.)

Figure 2:
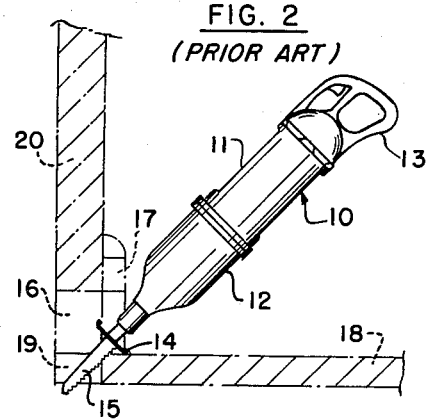
FIGURE 2 is a view taken across the lines 2—2 of FIGURE 1, but illustrating the prior art requirement for tilting of the sabre saw in a vertical plane (perpendicular to the work) in order to successfully complete the cutting operation.

As shown in FIGURE 1, in the course of making the pocket cut 16 in the baseboard 17, because of the inherent geometry or configuration of the tool itself, there will be a point at which the shoe 14 or the switch handle 13 (or both) will contact the floor 18 in advance of the completion of the pocket cut 16; and as illustrated in FIGURE 2, it is then necessary (using the teachings of the prior art and without the benefit of the present invention) to tilt the sabre saw 10 upwardly in a vertical plane in order to successfully complete the cut 16. This process is inefficient and awkward to perform, and besides, it results in the unnecessary and undesirable removal of material 19 from the floor 18. Now, as contradistinguished therefrom, the present invention provides means whereby the saw blade 15 may be secured in an alternate position in a plane which is perpendicular to that of the previous position; and the entire sabre saw 10 may then be displaced approximately 90° about its longitudinal axis and positioned on its side, such that the cutting teeth of the blade 15 are substantially parallel to (or aligned with) the side surfaces of the sabre saw 10.

Figure 4:
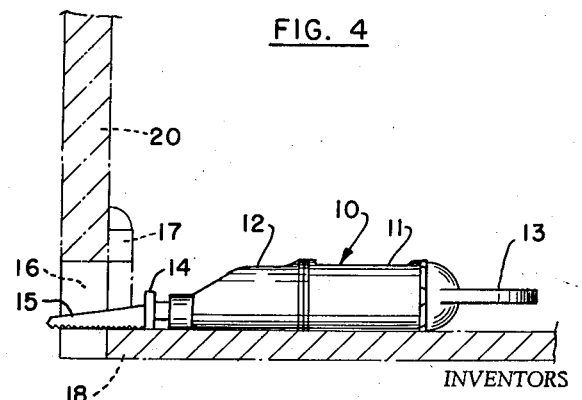
FIGURE 4 is a view taken across the lines 4—4 of FIGURE 3, corresponding substantially to the prior art view of FIGURE 2, but illustrating that with the techniques of the present invention, it is not necessary to tilt the sabre saw in a vertical plane to make a "flush-to" cut, nor is it necessary to cut into part of the floor board itself as is otherwise illustrated in FIGURE 2.

As illustrated in FIGURE 4, a perfectly "flush-to" cut may then be made in the baseboard 17 and supporting wall 20 without removing substantially any material from the floor board 18, or without requiring that the sabre saw 10 be tilted in a vertical plane, as is otherwise the case with respect to the prior art illustration of FIGURE 2.

Moreover, there is illustrated in FIGURES 5 and 6 a few of the other uses to which the present invention may be put. For example, in FIGURE 5, the sabre saw 10 is held "flush-to" the wall 20 in order to cut off the baseboard 17; while in FIGURE 6, there is illustrated the general situation of making a "flush-to" cut in a workpiece 21 which is secured to a much wider workpiece 22.

In partial summary, then, it is the provision of a sabre saw 10 whose reciprocating blade 15 may be secured in an alternate mutually-perpendicular position, which facilitates the efficient making of "flush-to" cuts by the simple additional expedient of displacing the sabre saw 10 approximately 90° about its longitudinal axis and in effect positioning it on its side so as to properly complete the "flush-to" cut; and one particular embodiment of a two-position blade clamping means will now be described in detail with reference to the remaining drawings.

With reference to FIGURE 7, there is illustrated the forwardmost portion of the sabre saw 10, including the shoe 14, blade 15, and a suitable perforated guard 23. A portion of the guard 23 is broken away to illustrate the reciprocating shaft 24 and the blade clamping means, the latter being denoted generally by the numeral 25. The details of clamping means 25 may be seen more particularly in FIGURE 12. The reciprocating shaft 24 (only a portion of which is shown) may be tubular or hollow and may have a square cross-section and four mutually-perpendicular walls, two adjacent (mutually-perpendicular) walls of which are denoted as 26 and 27, respectively. A continuous right-angle slot 28 is formed within walls 26 and 27 in a plane or planes which are transverse to the longitudinal axis of the shaft 24, and a U-shaped clamping member 29 is adapted to fit over either of the walls 26 or 27 of the shaft 24 and to be slidably guided thereon. Clamping member 29 has a hole 30 through which passes a hexagonal-head screw 31. Screw 31 also passes through opening 32 in the shank of blade 15 and through slot 28 to engage a locking nut 33 within the hollow shaft 24.

It will be appreciated, then, that when the screw 31 is loosened, that the blade 15 may be removed and the entire clamping means 25 (including the screw 31, clamping member 29, and nut 33) may be pivoted approximately 90° (circumferentially) about the longitudinal axis of the shaft 24. The blade 15 may be reinserted such that the blade 15 (that is to say, the shank thereof) will rest against the other of the adjacent mutually-perpendicular walls (26 or 27); thereafter, the screw 31 may be tightened to secure the blade 15 in a new position or plane which is perpendicular to the previous position of the blade 15. The sides of the nut 33 are somewhat rounded so as to accommodate the movement of the nut 33 between the walls 26 and 27 and preclude its being jammed or hung-up within the shaft 24.

Figure 11:
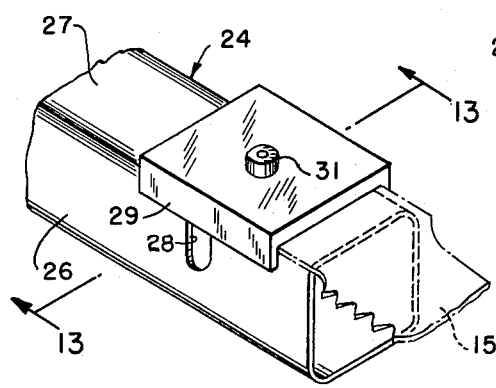
FIGURE 11 is an enlarged perspective view of a portion of the reciprocating shaft, illustrating the blade clamping means to secure the blade to the shaft in the "flush-to" cutting position.
Figure 12:
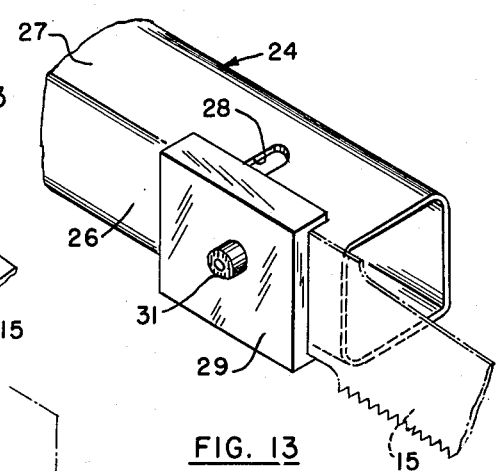
FIGURE 12 is an enlarged perspective view, corresponding to that of FIGURE 11, but illustrating the blade secured to the shaft in the ordinary or normal position.
Figure 10:
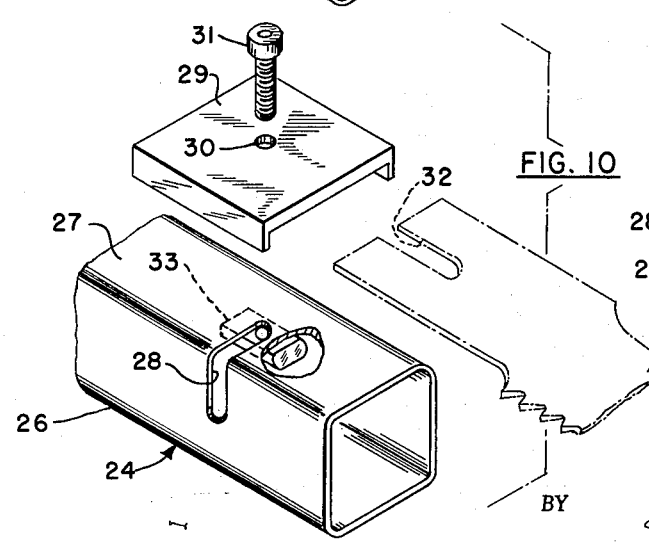
FIGURE 10 is an exploded view, illustrating the elements of the two-position blade clamping means.
Figure 13:
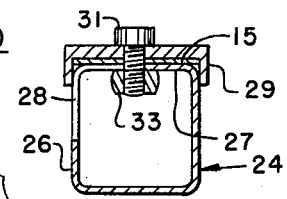
FIGURE 13 is a view taken across the lines 13—13 of FIGURE 11.

The pivoting action of the clamping means 25 is limited in either direction by the extent of the slot 28; and the alternate positions of the clamping means 25 and blade 15 are illustrated in FIGURES 11 and 12, while a cross-section of the aforesaid parts (in assembled relationship) is provided in FIGURE 13.

Moreover, with reference to FIGURE 7, the shaft 24 is illustrated in its approximate midpoint of reciprocation, it being noted that a usual length of stroke for a conventional sabre saw 10 is between ⅝ inch and 1 inch. The position of the blade 15, as shown in FIGURE 7 corresponds to that as shown in FIGURES 1, 2, and 12, it being noted that the blade 15 is allowed to protrude through slot 34 in shoe 14 as shown in FIGURE 8. An alternate position of the blade 15, that is to say, the position of the blade 15 in FIGURES 3, 4, 5, 6, 9, and 11, is illustrated by the dotted lines in FIGURE 7; and FIGURE 8a illustrates that the auxiliary slot 35 (transverse to the longitudinal slot 34) in shoe 14 accommodates the "flush-to" position of the blade 15. In this latter position, it will be further appreciated that the length and downward tilt of the blade 15 may be chosen such that the actual cutting teeth of the blade 15 will clear the guard 23 and will be substantially aligned (longitudinally) with the flat outward side of the guard 23.

Figure 9:
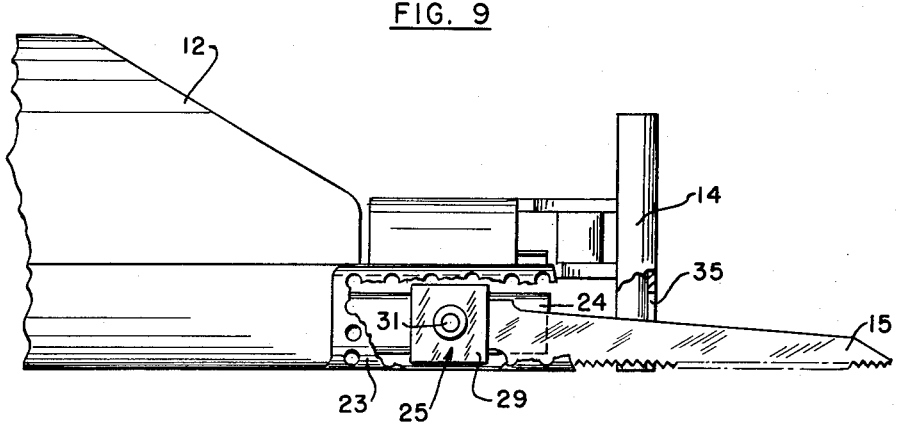
FIGURE 9 is an enlarged side elevation of the forwardmost portion of the sabre saw, taken along the lines 9—9 of FIGURE 7, but illustrating the blade being secured in its ultimate position (as in FIGURES 3 and 4) in order to make an efficient "flush-to" cut.

With reference to FIGURE 9, there is illustrated a view of the blade 15 and clamping means 25 (in its alternate "flush-to" position) as viewed from the lines 9—9 of FIGURE 7. In such a position, the sabre saw 10 may be used conveniently for a variety of efficient "flush-to" cuts, as has been hereinbefore explained in detail.

In usage, in order to adjust from one position to another, the guard 23 may be raised or lifted about hinge 36, and the hexagonal-head screw 31 may be loosened by say, an Allen-type wrench. The adjustment can then be made to the other of the two mutually-perpendicular planes by the simple expedient of say, using the Allen wrench as a lever; and thereafter, the screw 31 may be tightened and the guard 23 may be snapped back into its proper position. The guard 23 is perforated which accommodates a slight loosening of the screw 31, so as to replace the blade 15 without necessitating a lifting of the guard 23.

It will be appreciated that the term "two-position" clamping means as used herein refers to the two mutually-perpendicular planes within which the blade 15 may be secured to the sabre saw 10; and that in one of the positions (FIGURE 1) the blade 15 may be reversed, that is to say, the blade 15 will still be in the same plane, but the cutting teeth will be along an opposite edge. Thus, two positions of the blade are available in one of the planes, which makes the blade available in a total of three different positions (still two planes); a reversal of the blade will not be available in the alternate position, but this, however, is immaterial.

The sabre saw 10 illustrated in conjunction with the present invention may feature a universal shoe as described in the co-pending Atkinson application S.N. 38,965, filed June 27, 1960 and assigned to the same assignee as the present application; but for convenience of illustration, the shoe 14 of the saw has been illustrated to be stationary, that is to say, non-pivotable. For flush-to cutting, of course, it would be desirable to have the shoe 14 stationary, as herein illustrated.

Obviously, many modifications may be made without departing from the spirit of the present invention; therefore, within the scope of the appended claims, the invention may be practiced other than has been specifically described.

We claim:
1. A two-position blade clamping means for a sabre saw, comprising, a hollow reciprocating shaft including a forwardmost portion having a longitudinal axis and further having at least two adjacent mutually-perpendic- ular walls, said forwardmost portion of said shaft having a continuous slot formed in said two adjacent mutually-perpendicular walls transverse to said longitudinal axis of said forwardmost portion of said shaft, a saw blade including a shank portion, and means including a clamping member to alternately secure said shank of said blade to either of said two adjacent mutually-perpendicular walls of said forwardmost portion of said shaft, as desired.

2. A two-position blade clamping means for a sabre saw, comprising, a square cross-sectioned hollow reciprocating shaft including a forwardmost portion having a longitudinal axis and further having four mutually-perpendicular walls, said walls including two adjacent-mutually-perpendicular walls having a continuous right-angle slot formed therein transverse to said longitudinal axis of said forwardmost portion of said shaft, a saw blade including a shank portion, a clamping member to retain said shank of said blade against the outer surface of either of said two adjacent mutually-perpendicular walls of said forwardmost portion of said shaft, and fastening means operable through said slot to secure said clamping member and said shank of said blade to said forwardmost portion of said shaft, whereby said fastening means may be loosened sufficiently to allow said clamping member and said fastening means to be pivoted about said longitudinal of said shaft by an angular amount of approximately ninety degrees as limited by said slot, and whereby said fastening means may then be tightened to secure said clamping member and said shank of said blade to said shaft in a new plane which is approximately perpendicular to the previous plane of said blade.

3. A two-position blade clamping means as defined in claim 2, wherein said clamping member has a substantially U-shaped cross-section and is adapted to straddle said shaft and to be slidably guided thereon.

4. A two-position blade clamping means as defined in claim 2, wherein said fastening means comprises, a locking nut within said tubular shaft and disposed adjacent to said slot, and a screw passing through said clamping member and said slot to engage said locking nut.

5. A sabre saw, comprising, a motor housing, a gear case secured forwardly of said motor housing, a shoe secured forwardly of said gear case, said shoe having a pair of parallel longitudinal side edges, said shoe being provided with a pair of slots consisting of a longitudinal slot and a transverse slot at right angles to each other, said longitudinal slot being formed in said shoe parallel to the longitudinal axis of said shoe and along one of the side edges of said shoe, and said transverse slot being in communication with said longitudinal slot intermediate the extremities of said longitudinal slot, a reciprocating shaft journaled in said gear case, a saw blade having a lower edge provided with a series of cutting teeth, and means to secure said saw blade to said reciprocating shaft in either of two mutually-perpendicular preselected positions, whereby said saw blade will either pass through said longitudinal slot or said transverse slot in said shoe, respectively, and whereby in the latter position, said lower edge of said saw blade will be aligned with the outer longitudinal edges of said motor housing and said gear case for "flush-to" cutting.

References Cited in the file of this patent
UNITED STATES PATENTS

| | | |
|---|---|---|
| 2,017,895 | Davey | Oct. 22, 1935 |
| 2,721,587 | Dremel | Oct. 25, 1955 |
| 2,735,685 | Karr | Feb. 21, 1956 |
| 2,824,455 | Ristow et al. | Feb. 25, 1958 |
| 2,906,304 | Levine | Sept. 29, 1959 |